United States Patent
Ham et al.

(10) Patent No.: US 7,163,573 B2
(45) Date of Patent: Jan. 16, 2007

(54) CHEMICAL FILTER MEDIUM, CHEMICAL FILTER INCLUDING THE CHEMICAL FILTER MEDIUM AND METHOD FOR MANUFACTURING THE CHEMICAL FILTER

(75) Inventors: Dong-Seok Ham, Gyeonggi-do (KR); Hoo-Kun Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 10/750,780

(22) Filed: Jan. 2, 2004

(65) Prior Publication Data

US 2004/0146436 A1 Jul. 29, 2004

(30) Foreign Application Priority Data

Jan. 27, 2003 (KR) .................... 10-2003-0005326

(51) Int. Cl.
 *B01D 53/04* (2006.01)
(52) U.S. Cl. ............................ 96/131; 96/132; 96/135; 96/153
(58) Field of Classification Search ............... 96/121, 96/131, 132, 134, 135, 153; 95/129, 138; 423/219, 235, 239.2; 454/187
See application file for complete search history.

(56) References Cited

U.S. PATENT DOCUMENTS

| | | | | |
|---|---|---|---|---|
| 4,684,510 A | * | 8/1987 | Harkins | 423/210 |
| 5,772,738 A | * | 6/1998 | Muraoka | 96/129 |
| 5,944,878 A | * | 8/1999 | Lindhe | 96/132 |
| 6,156,089 A | * | 12/2000 | Stemmer et al. | 55/467 |
| 6,511,528 B1 | * | 1/2003 | Lansbarkis et al. | 95/118 |
| 2001/0009125 A1 | * | 7/2001 | Monereau et al. | 95/117 |

FOREIGN PATENT DOCUMENTS

| | | |
|---|---|---|
| JP | 11319460 | 11/1999 |
| JP | 2001276608 | 10/2001 |
| JP | 2001300218 | 10/2001 |
| WO | WO 01/70391 A1 | 9/2001 |

OTHER PUBLICATIONS

English language of Abstract for Japanese Patent Publication No. JP11319460, published Nov. 24, 1999.
English language of Abstract for Japanese Patent Publication No. JP2001276608, published Oct. 9, 2001.
English language of Abstract for Japanese Patent Publication No. JP2001300218, published Oct. 30, 2001.
English language abstract of International Publication No. WO 01/70391 A1.

* cited by examiner

*Primary Examiner*—Frank M. Lawrence
(74) *Attorney, Agent, or Firm*—Marger Johnson & McCollom, P.C.

(57) ABSTRACT

A chemical filter medium for removing ozone and nitrogen oxide includes a first ozone absorption layer for mainly removing ozone having a filtering base material for removing ozone, a first nitrogen oxide absorption layer for mainly removing nitrogen oxide formed on the first ozone absorption layer that includes a filtering base material for removing nitrogen oxide, and a second ozone absorption layer formed on the first nitrogen oxide absorption layer that includes a filtering base material for removing ozone. The chemical filter medium can simultaneously remove ozone and nitrogen oxide.

42 Claims, 10 Drawing Sheets

CHEMICAL FILTER MEDIUM, CHEMICAL FILTER INCLUDING THE CHEMICAL FILTER MEDIUM AND METHOD FOR MANUFACTURING THE CHEMICAL FILTER

CROSS REFERENCE TO RELATED APPLICATION

This application claims priority under 35 USC § 119 from Korean Patent Application No. 2003-5326, filed on Jan. 27, 2003, the contents of which are incorporated herein by reference in their entirety.

BACKGROUND OF THE INVENTION

1. Field of the Invention

The invention relates to a chemical filter medium for filtering and removing chemicals, a chemical filter including the chemical filter medium, and a method of manufacturing the chemical filter. More particularly, the invention relates to a chemical filter medium employed in a clean room for removing chemical contaminants such as ozone or nitrogen oxide, a chemical filter including the chemical filter medium, and a method of manufacturing the chemical filter.

2. Description of the Related Art

Generally, minute devices such as semiconductor devices are manufactured in a clean room where contaminants having sizes larger than a critical size are removed. Particularly, the contamination level in the clean room greatly affects the throughput of a semiconductor device manufacturing process.

As semiconductor devices become more highly integrated using a wafer having large diameter, the contamination degree of the clean room should be precisely controlled because very minute contaminants in the clean room may cause failures in the operation of the semiconductor devices. Here, the minute particles in the clean room may include particles such as minute dust particles and chemical contaminants such as noxious gases.

The chemical contaminants in the clean room in which the semiconductor devices are manufactured are controlled using a chemical filter. The chemical filter generally removes noxious gases using impregnated activated carbon as a filter medium that collects the noxious gases. The impregnated activated carbon includes conventional activated carbon and metal, or metal salts impregnated on the surface and inner pores of the conventional activated carbon. With the metal or the metal salts, the impregnated activated carbon can have improved catalytic characteristics such as chemical activation and selective absorption relative to specific components. The chemical filter having the impregnated activated carbon as the filter medium effectively removes chemical contaminants generated in the clean room such as ozone or ammonia.

However, the chemical filter having the impregnated activated carbon as the filter medium may not remove nitrogen oxide and sulfur oxide that exist in the clean room in minute amounts. As the semiconductor devices have been highly integrated, minute quantities of nitrogen oxide or sulfur oxide in the clean room may cause the failure of the semiconductor devices. The nitrogen oxide or the sulfur oxide should be removed to prevent the failure of the semiconductor devices. To remove the nitrogen oxide and the sulfur oxide from the clean room, an additional chemical filter having a filter medium for removing the nitrogen oxide and the sulfur oxide is required.

As described above, the conventional chemical filter removes one contaminant or similar kinds of contaminants. Various contaminants are contained in an air introduced in the clean room so that various chemical filters are installed in the clean room as a multi-layered construction so as to remove these different contaminants. However, the space in the clean room for locating these chemical filters is insufficient. Moreover, there are significant costs for maintaining all of these various chemical filters.

To solve these problems, a chemical filter is preferably provided which removes two or three kinds of contaminants at the same time. Examples of this chemical filter having several filtering base materials as a filter medium are disclosed in the Japanese Laid Open Patent Publication 2001-300218, Japanese Laid Open Patent Publication 2001-276608 and Japanese Patent Laid Open Patent Publication No. 1999-319460.

FIG. 1 is a cross-sectional view illustrating an example of the conventional filter mediums disclosed in the above publications. Referring to FIG. 1, the conventional filter medium comprises a mixture of several filtering base materials such as activated carbon 10 or zeolite 12, and a resin, etc. However, this conventional chemical filter including the mixture of the filtering base materials may not have good overall contaminant removal efficiency. Generally, the conventional chemical filter including the mixture of filtering base materials has relatively high removal efficiency of ozone, but has poor removal efficiency of nitrogen oxide. Furthermore, the conventional chemical filter may hardly remove nitrogen monoxide.

SUMMARY OF THE INVENTION

It is one feature of the present invention to provide a chemical filter medium that simultaneously removes ozone and nitrogen oxide.

It is another feature of the present invention to provide a chemical filter including a chemical filter medium to simultaneously remove ozone and nitrogen oxide.

It is still another feature of the present invention to provide a method of manufacturing a chemical filter including a chemical filter medium that simultaneously removes ozone and nitrogen oxide.

In accordance one aspect of the present invention, a chemical filter medium comprises a first ozone absorption layer for mainly removing ozone, a first nitrogen oxide absorption layer for mainly removing nitrogen oxide, and a second ozone absorption layer for mainly removing ozone. The first ozone absorption layer includes a first filtering base material for removing ozone, and the first nitrogen oxide absorption layer includes a filtering base material for removing nitrogen oxide. The first nitrogen oxide absorption layer is formed on the first ozone absorption layer, and the second ozone absorption layer is formed on the first nitrogen oxide absorption layer. The second ozone absorption layer includes a second filtering base material for removing ozone. Each of the first and second filtering base materials for removing ozone includes activated carbon and an impregnating agent impregnated in the activated carbon such as potassium hydroxide (KOH) or manganese monoxide (MnO). In addition, the filtering base material for removing nitrogen oxide includes zeolite and an impregnating agent impregnated in the zeolite such as potassium permanganate (KMnO4).

In accordance with another aspect of the present invention, a chemical filter medium comprises a first layer for mainly removing ozone, a second layer for mainly removing nitrogen oxide formed on the first layer, and a third layer for mainly removing ozone formed on the second layer. The first layer includes a filtering base neutral material and a catalyst for reducing ozone impregnated in the filtering base neutral material. The second layer the second layer includes a filtering base oxide material and a catalyst for decomposing and removing nitrogen oxide impregnated in the filtering base oxide material. The third layer includes a filtering base neutral material and a catalyst for reducing ozone impregnated in the filtering base neutral material. Each of the filtering base neutral materials of the first and third layers includes activated carbon. Each of the catalyst for reducing ozone of the first and third layers includes potassium hydroxide or manganese monoxide. The filtering base oxide material of the second layer includes zeolite. The catalyst for decomposing and removing nitrogen oxide of the second layer includes potassium permanganate.

In accordance with still another aspect of the present invention, a chemical filter comprises a tray having an upper case and a lower case coupled to the upper case, a first ozone absorption layer for mainly removing ozone filled at lower portion of the lower case, a first nitrogen oxide absorption layer for mainly removing nitrogen oxide filled on the first ozone absorption layer in the lower case, and a second ozone absorption layer for mainly removing ozone filled on the first nitrogen oxide absorption layer in the lower case. The first ozone absorption layer includes a filtering base material for removing ozone. The first nitrogen oxide absorption layer includes a filtering base material for removing nitrogen oxide. The second ozone absorption layer includes a filtering base material for removing ozone. Additionally, the chemical filter further comprises a second nitrogen oxide absorption layer formed on the second ozone absorption layer in the lower case, and a third ozone absorption layer formed on the second nitrogen oxide absorption layer in the lower case.

In accordance with still another aspect of the present invention, a method of manufacturing a chemical filter comprises providing a tray including an upper case and a lower case separately coupled to the upper case, filling a first ozone absorption layer in the lower case of the tray, forming a first nitrogen oxide absorption layer on the first ozone absorption layer in the lower case, forming a second ozone absorption layer on the first nitrogen oxide absorption layer in the lower case, and fixing the upper case to the lower case, wherein the upper case covers the lower case. Here, the first ozone absorption layer includes a filtering base material for removing ozone, and the first nitrogen oxide absorption layer includes a filtering base material for removing nitrogen oxide. In addition, the second ozone absorption layer includes a filtering base material for removing ozone.

According to the present invention, a chemical filter medium simultaneously removes various contaminants such as ozone or nitrogen oxide. Thus, manufacturing cost of semiconductor devices can be reduced due to an absence of various filters respectively employed concerning various contaminants. Further, since a chemical filter having the chemical filter medium efficiently removes various contaminants, the throughput of the semiconductor manufacturing process can be improved.

BRIEF DESCRIPTION OF THE DRAWINGS

The features and advantages of the present invention will become readily apparent by reference to the following detailed description when considered in conjunction with the accompanying drawings, in which.

DETAILED DESCRIPTION OF THE INVENTION

Figure 1:
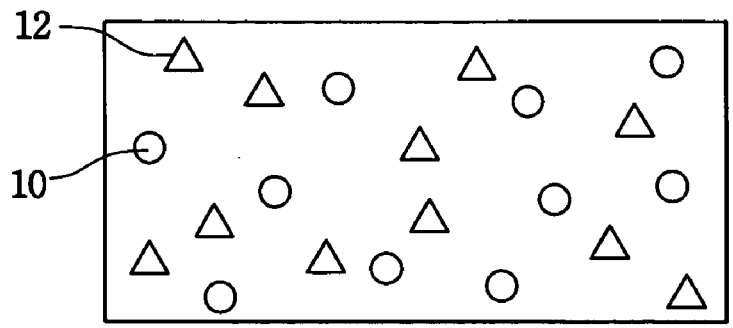
FIG. 1 is a cross-sectional view illustrating an example of a conventional filter medium.

The present invention now will be described more fully hereinafter with reference to the accompanying drawings, in which preferred examples of the invention are shown. This invention may, however, be embodied in many different forms and should not be construed as limited to the examples set forth herein; rather, these examples are provided so that this disclosure will be thorough and complete, and will fully convey the scope of the invention to those skilled in the art. Like reference numerals refer to like elements throughout. The relative thickness of layers in the illustrations may be exaggerated for purposes of describing the present invention.

A chemical filter medium of the present invention has a first ozone absorption layer for mainly removing ozone. The first ozone absorption layer includes filtering base material for removing ozone.

The filtering base material for removing ozone includes a filtering base neutral material, and a catalytic material for reducing ozone impregnated in the filtering base neutral material. For example, the filtering base material for removing ozone includes activated carbon and a catalyst such as, for example, potassium hydroxide (KOH) or manganese monoxide (MnO), impregnated in the activated carbon. When the catalyst is potassium hydroxide or manganese monoxide, an impregnated amount of the potassium hydroxide or the manganese monoxide is preferably in the range of about 5 to about 10 weight percent based on the weight of the activated carbon. The ozone to be removed is filtered by the activated carbon. The filtered ozone is reduced into oxygen by the catalyst impregnated in the activated carbon, and the ozone is thereby removed from the filter medium.

The following specific reaction equations (1) and (2) indicate mechanisms in which the ozone is removed form the filter medium when potassium hydroxide or manganese monoxide is used as the catalyst.

$$KOH + 2O_3 \rightarrow KOH + 3O_2 \quad (1)$$

$$MnO + 2O_3 \rightarrow MnO + 3O_2 \quad (2)$$

The chemical filter medium of the present invention has a first nitrogen oxide absorption layer for mainly removing nitrogen oxide. The first nitrogen oxide absorption layer includes a filtering base material for removing nitrogen oxide. The first nitrogen oxide absorption layer is formed on the first ozone absorption layer. For example, the first nitrogen oxide absorption layer removes nitrogen oxide such as nitrogen monoxide (NO), nitrogen dioxide ($NO_2$), nitrogen trioxide ($NO_3$), dinitrogen monoxide ($N_2O$), nitrogen trioxide ($NO_3$), dinitrogen tetraoxide ($N_2O_4$), dinitrogen pentaoxide ($N_2O_5$), etc. The filtering base material for removing nitrogen oxide efficiently removes the nitrogen monoxide and nitrogen dioxide generated.

The filtering base material for removing nitrogen oxide includes a filtering base oxide material and catalyst for decomposing and removing nitrogen oxide impregnated in the filtering base oxide material. Particularly, the filtering base material for removing nitrogen oxide includes an inorganic absorption agent in which a metal oxide is impregnated in zeolite. Here, the preferred inorganic absorption agent includes a metal oxide or metal peroxide. For example, the inorganic absorption agent impregnated in the zeolite includes the metal peroxide such as potassium permanganate ($KMnO_4$) or the metal oxide such as manganese monoxide (MnO).

The following reaction equations (3) to (5) indicate mechanisms in which the nitrogen dioxide is removed when potassium permanganate is used as the catalyst.

$$2NO_2 + 2KOH \rightarrow KNO_3 + KNO_2 + H_2O \quad (3)$$

$$KNO_2 + NO_2 \rightarrow KNO_3 + NO \quad (4)$$

$$NO + KMnO_4 \rightarrow KNO_3 + MnO_2 \quad (5)$$

In accordance with the above reaction equations (3) and (4), the nitrogen dioxide is removed using the filtering base material for removing ozone having the potassium hydroxide impregnated therein as the catalyst. Portions of the removed nitrogen dioxide are converted into nitrogen monoxide. The nitrogen monoxide is removed after it is changed to a metal nitride by the metal oxide according to the reaction of equation (5).

A second ozone absorption layer is formed on the first nitrogen oxide absorption layer. The second ozone absorption layer includes a filtering base material for mainly removing the ozone. The filtering base material for removing the ozone of the second ozone absorption layer is substantially identical to that of the first ozone absorption layer.

Since the chemical filter medium has the first ozone absorption layer, the first nitrogen oxide absorption layer, and the second ozone absorption layer, the ozone and the nitrogen oxide are sequentially removed by the chemical filter medium. In the first ozone absorption layer, the concentration of the nitrogen monoxide becomes relatively high at the outlet thereof as time passes because the nitrogen dioxide is changed to the nitrogen monoxide by the activated carbon within the first ozone absorption layer. In addition, the first nitrogen oxide absorption layer oxidizes the nitrogen monoxide to form a stable nitrate, thereby removing the nitrogen monoxide. Since the chemical filter medium includes the first ozone absorption layer, the first nitrogen oxide absorption layer and the second ozone absorption layer, the filter medium can efficiently remove the nitrogen monoxide and the nitrogen dioxide employing the effect of the mutual properties of the ozone and nitrogen oxide absorption layers.

Alternatively, the chemical filter medium further includes a second nitrogen oxide absorption layer and a third ozone absorption layer successively formed on the second ozone absorption layer. The second nitrogen oxide absorption layer has a filtering base material for removing nitrogen oxide, and the third ozone absorption layer includes a filtering base material for removing ozone. The filtering base material for removing nitrogen oxide of the second nitrogen oxide absorption layer is typically substantially identical to that of the first nitrogen oxide absorption layer. Also, the filtering base material for removing ozone of the third ozone absorption layer is typically substantially identical to that of the first ozone absorption layer.

In order to effectively remove the nitrogen monoxide and the nitrogen dioxide through the mutual assistance among the ozone and nitrogen oxide absorption layers of the chemical filter medium, the ozone absorption layers are preferably positioned at a front portion and a rear portion of the chemical filter medium, respectively. The ozone absorption layer positioned at the rear portion of the chemical filter is useful for finally removing the contaminants like the ozone or sulfur oxide.

Hereinafter, preferred examples of the present invention will be described with reference to the accompanying drawings.

Chemical Filter Medium

EXAMPLE 1

Figure 2:
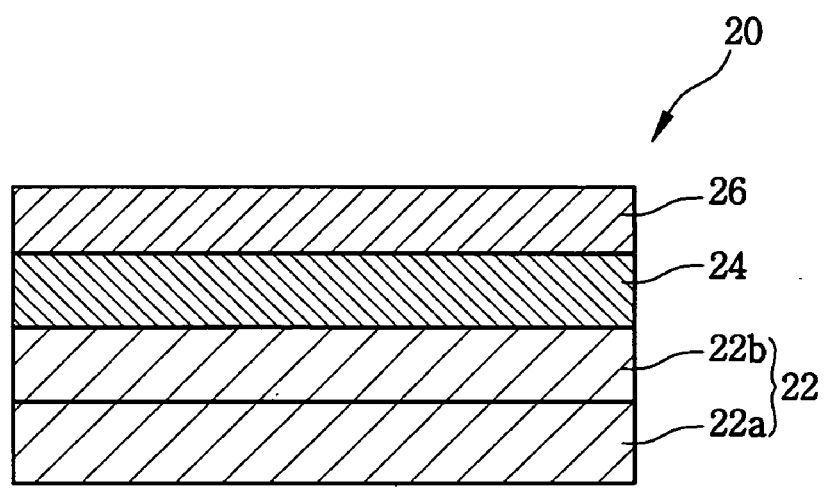
FIG. 2 is a cross-sectional view illustrating a chemical filter medium according to one embodiment of the present invention.

FIG. 2 is a cross-sectional view illustrating a chemical filter medium 20 according to one example. The chemical filter medium 20 is installed in a tray.

Referring to FIG. 2, the chemical filter medium 20 includes a first ozone absorption layer 22. The first ozone absorption layer 22 includes an impregnated activated carbon in which catalyst for reducing ozone, for example, potassium hydroxide, is impregnated in activated carbon. That is, the first ozone absorption layer 22 includes the activated carbon as a filtering base neutral material, and the potassium hydroxide as alkaline catalyst adsorbed in the activated carbon. The first ozone absorption layer 22 is generally positioned at a front portion of the chemical filter medium 20 (at a lower portion of the chemical filter medium 20 in FIG. 2). The potassium hydroxide is impregnated in the range of preferably about 5 to about 10 weight percent, more preferably about 7 to about 8 weight percent, based on the weight of the activated carbon.

As shown in FIG. 2, the first ozone absorption layer 22 has a double layer structure that includes a lower ozone absorption film 22a and an upper ozone absorption film 22b. These two ozone films 22a and 22b may be formed by discrete manufacturing processes or may be formed together by one manufacturing process. Alternatively, the first ozone absorption layer 22 may include a single ozone absorption film.

A first nitrogen oxide absorption layer 24 is formed on the first ozone absorption layer 22. The first nitrogen oxide absorption layer 24 includes an inorganic material, such as zeolite in which potassium permanganate is impregnated as a catalyst, for removing nitrogen oxide. Here, the zeolite is present for filtering nitrogen oxide. The potassium permanganate is impregnated in the zeolite at preferably about 10 to about 15 weight percent, more preferably about 12 to about 13 weight percent, based on the weight of the zeolite. The thickness of the first nitrogen oxide absorption layer 24 is typically about half the thickness of the first ozone absorption layer 22.

A second ozone absorption layer 26 is formed on the first nitrogen oxide absorption layer 24. The second ozone absorption layer 26 is generally positioned at a rear portion of the chemical filter 20 with respect to the direction of an air flowed into the chemical filter 20. The thickness of the second ozone absorption layer 26 is substantially identical to that of the first nitrogen oxide absorption layer 24.

The filter medium 20 has the first ozone absorption layer 22 comprising two films, the first nitrogen oxide absorption layer 24 formed on the first ozone absorption layer 22, and the second ozone absorption layer 26 formed on the first nitrogen oxide absorption layer 24. Each of the first nitrogen oxide and ozone absorption layers has a substantially identical thickness. Thus, the first ozone absorption layer 22 depicted includes two films 22a and 22b having a thickness which is about twice the thickness of the nitrogen oxide absorption layer 24 or the second ozone absorption layer 26. As the absorption 22, 24 and 26 layers become thicker, the reaction time and retention time of contaminants typically becomes longer in these absorption layers 22, 24 and 26. Thus, the percentage of removal efficiency of the contaminants may increase when the absorption layers 22 and 24 and 26 have a greater thickness.

EXAMPLE 2

Figure 3:
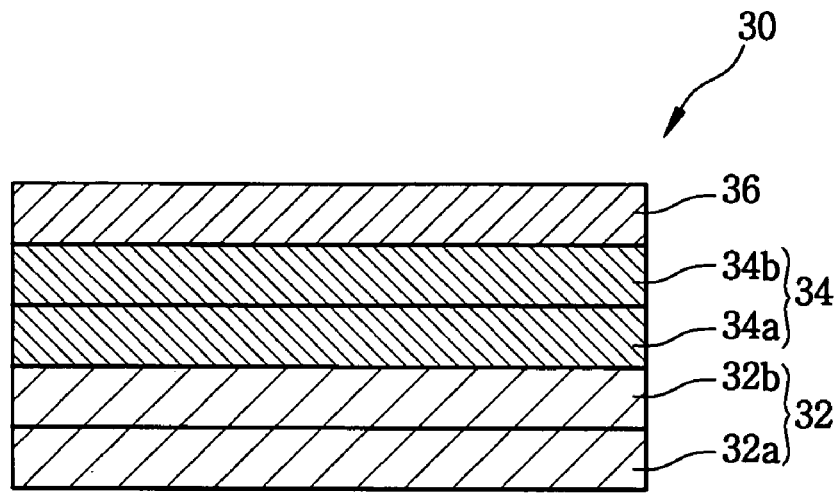
FIG. 3 is a cross-sectional view illustrating a chemical filter medium according to another embodiment of the present invention.

FIG. 3 is a cross-sectional view illustrating a chemical filter medium 30 according to another embodiment of the present invention. The chemical filter medium 30 is filled in one tray.

The chemical filter medium 30 has a structure substantially identical to the chemical filter medium 20 of Example 1. Particularly, the chemical filter medium 30 has a first ozone absorption layer 32, a nitrogen oxide absorption layer 34 and a second ozone absorption layer 36. However, the thickness of the first ozone absorption layer 32, the nitrogen oxide absorption layer 34, and the second ozone absorption layer 36 are different from those of absorption layers 22, 24 and 26 of Example 1. Additionally, each of filtering base materials of the first ozone absorption layer 32, the second ozone absorption layer 36 and the nitrogen oxide absorption layer 34 is substantially identical to those of the absorption layers 32, 34 and 36 of Example 1.

Referring to FIG. 3, the chemical filter medium 30 has the first ozone absorption layer 32 for removing ozone. The first ozone absorption layer 32 is positioned at a front portion of the chemical filter medium 30 with respect to an air flowing direction (from a lowest portion of the chemical filter medium 30 in FIG. 3). As illustrated in FIG. 3, the first ozone absorption layer 32 has a double layer construction that includes a lower ozone absorption layer 32a and an upper ozone absorption layer 32b.

A nitrogen oxide absorption layer 34 for removing the nitrogen oxide is formed on the first ozone absorption layer 32. As shown in FIG. 3, the nitrogen oxide absorption layer 34 is a double layer structure that includes a lower nitrogen oxide absorption film 34a and an upper nitrogen oxide absorption film 34b. These two nitrogen oxide absorption films 34a and 34b may be formed by discrete manufacturing processes or may be formed as one thick layer by one manufacturing process, which may be similar to the first ozone absorption layer 32. The nitrogen oxide absorption layer 34 has a thickness substantially identical to that of the first ozone absorption layer 32.

A second ozone absorption layer 36 is formed on the nitrogen oxide absorption layer 34. The second ozone absorption layer 36 is positioned at a rear portion of the chemical filter medium 30 with respect to an air flowing direction. The second ozone absorption layer 36 has a thickness which is about half that of the nitrogen oxide absorption layer 34. The chemical filter medium 30 includes the first ozone absorption layer 32 having two films 32a and 32b, nitrogen oxide absorption layer 34 having two films 34a and 34b formed on the first ozone absorption layer 32, and the second ozone absorption layer 36 formed on the nitrogen oxide absorption layer 34. Each of the films 32a, 32b, 34a and 34b of the absorption layers 32 and 34 has a substantially identical thickness. Thus, the first ozone absorption layer 32 having two films 32a and 32b and the nitrogen oxide absorption layer 34 having two films 34a and 34b have about twice the thickness of the second ozone absorption layer 36.

EXAMPLE 3

Figure 4:
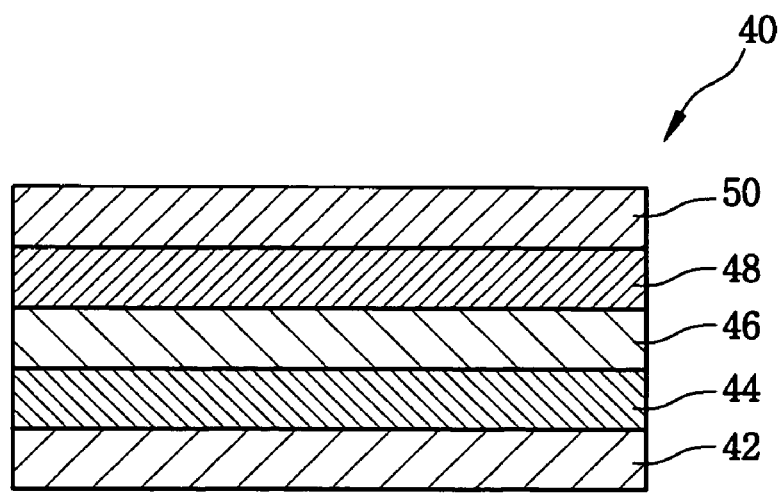
FIG. 4 is a cross-sectional view illustrating a chemical filter medium according to still another embodiment of the present invention.
Figure 5:
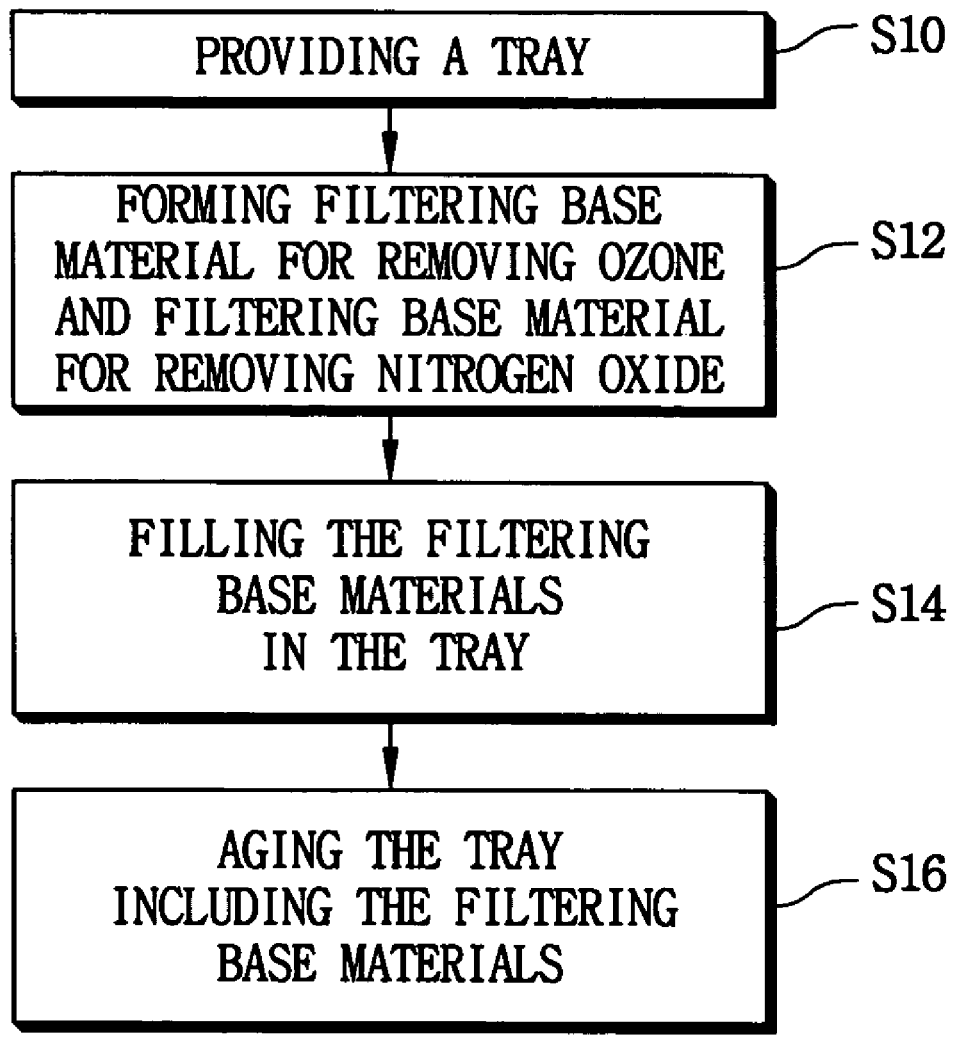
FIG. 5 is a flow chart illustrating a method of manufacturing a hybrid chemical filter according to an embodiment of the present invention.
Figure 6:
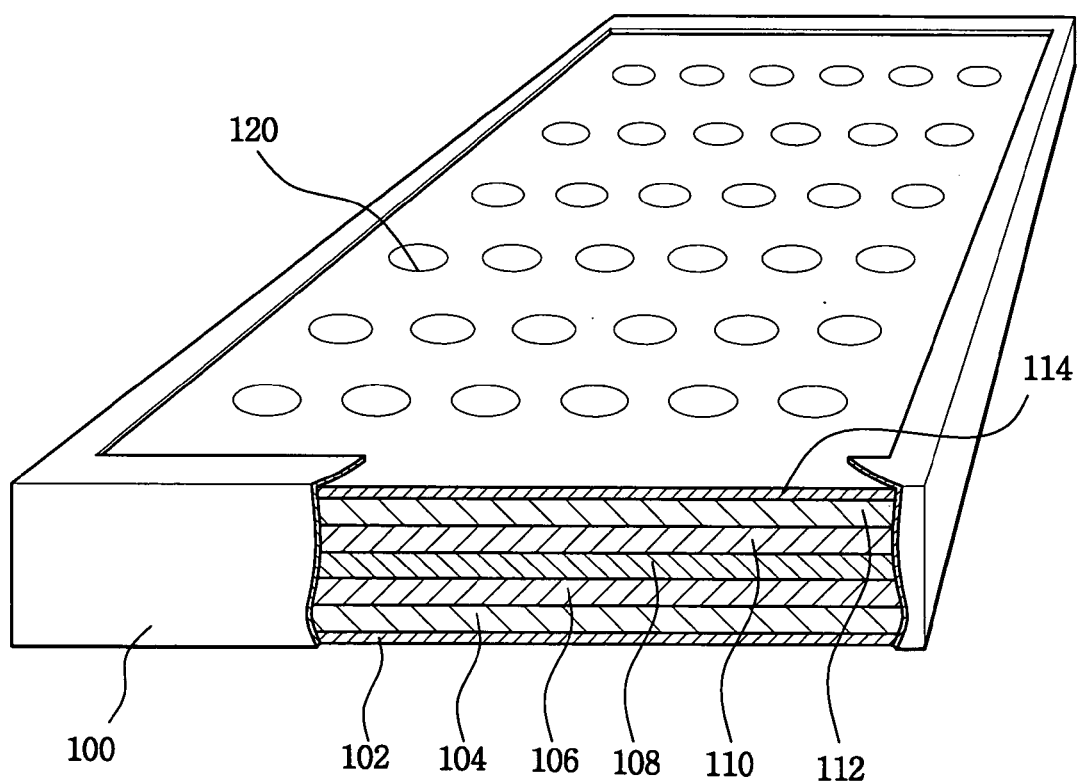
FIG. 6 is a partially cut perspective view illustrating a hybrid chemical filter according to the present invention.

FIG. 4 is a cross-sectional view illustrating a chemical filter medium 40 according to a still another embodiment of the present invention. The chemical filter medium 40 is filled in one tray.

In the chemical filter medium 40 of the present example, each of the filtering base materials of ozone absorption layers 42, 46 and 50 and the nitrogen oxide absorption layers 44 and 48 is substantially identical to those of Example 1 and 2. However, the alignment order and thickness of the ozone absorption layers 42, 46 and 50 and the nitrogen oxide absorption layers 44 and 48 are different from those of Examples 1 and 2.

Referring to FIG. 4, the chemical filter medium 40 has a first ozone absorption layer 42 that is used primarily for removing ozone. The first ozone absorption layer 42 is positioned at a front portion of the chemical filter medium 40 with respect to an air flowing direction (from a lowest portion of the chemical filter medium 40 in FIG. 4).

A first nitrogen oxide absorption layer 44 for primarily removing nitrogen oxide is formed on the first ozone absorption layer 42. A second ozone absorption layer 46 also for primarily removing ozone is formed on the first nitrogen oxide absorption layer 44. A second nitrogen oxide absorption layer 48 also typically for removing nitrogen oxide is formed on the second ozone absorption layer 46.

A third ozone absorption layer 50 typically for removing ozone is formed on the second nitrogen oxide absorption layer 48. The third ozone absorption layer 50 is positioned at a rear potion of the chemical filter medium 40 with respect to the air flowing direction. The first ozone absorption layer 42, the second ozone absorption layer 46 and the third ozone absorption layer 50 have thickness substantially identical to those of the first nitrogen oxide absorption layer 44 and the second nitrogen oxide absorption layer 48.

As for the chemical filter medium 40 of the present example, the ozone absorption layers 42, 46 and 50, and the nitrogen oxide absorption layers 44 and 48, are respectively alternatively formed one atop another. That is, several absorption layers 42, 46 and 50 are formed at the front portion and the rear portion of the chemical filter medium 40 relative to the direction of the air flowing into the chemical filter medium 40.

Method of Manufacturing a Chemical Filter

A method of manufacturing a hybrid chemical filter including the filter medium 40 of Example 3 will hereafter be described. The filter medium 40 of Example 3 is filled in one tray of the hybrid chemical filter.

A tray 100 having an upper case and a lower case is provided in step S10. The lower case of the tray 100 has a preferred length of about 600 mm, a preferred width of about 400 mm, and a preferred thickness of about 20 mm. The tray 100 is typically formed using stainless steel.

A filtering base material for removing ozone and a filtering base material for removing nitrogen oxide are filled in the tray 100 in step S12. Particularly, the filtering base material is formed by impregnating potassium hydroxide in activated carbon. In an immersing process for forming the filtering base material for removing ozone, the immersed activated carbon is dried to form the filtering base material for removing ozone after the activated carbon is immersed in a potassium hydroxide aqueous solution The potassium hydroxide is impregnated in the activated carbon in the preferred range of from about 7 to about 8 weight percent based on the weight of the activated carbon. The measured amount of the impregnated potassium hydroxide is preferably about 5 to about 10 weight percent, based on the total weight of the activated carbon.

The filtering base material for removing nitrogen oxide is formed by impregnating potassium permanganate in zeolite. The filtering base material for removing nitrogen oxide is formed using an immersing process. The zeolite is immersed in a potassium permanganate aqueous solution, and the immersed zeolite is dried. The potassium permanganate is impregnated in the zeolite preferably by about 12 to about 13 weight percent based on the weight of the zeolite. Substantially, the measured amount of the impregnated potassium permanganate is preferably about 10 to about 15 weight percent based on the total weight of the zeolite.

In step S14, the filtering base materials are filled in the lower case of the tray 100 as a laminated construction. Hereinafter, the process of filling the filtering base material for removing ozone and the filtering base material for removing nitrogen oxide will be described with reference to the above-described Example 3.

A lower mesh (not shown) composed of stainless steel (SUS304) is installed on the inside of the lower case. A plurality of holes is formed in the lower mesh. A lower non-woven fabric 102 is attached to the lower mesh. The lower non-woven fabric 102 supports the filtering base material for removing ozone and the filtering base material for removing nitrogen oxide, and the lower non-woven fabric 102 removes particles introduced into the chemical filter.

A filtering base material for removing ozone having a first weight is filled in the lower case, where the lower non-woven fabric 102 is attached, so that a first ozone absorption layer 104 is formed in the lower case. Here, the weight of the filtering base material for removing ozone may be varied to adjust the thickness of the first ozone absorption layer 104. For example, the thickness of the first ozone absorption layer 104 may be thicker in proportion to the weight of the filtering base material for removing ozone, so that the weight of the filtering base material for removing ozone is controlled to advantageously adjust the thickness of the first ozone absorption layer 104.

A filtering base material for removing nitrogen oxide having a second weight is filled on the first ozone absorption layer 104 to form a first nitrogen oxide absorption layer 106. As described above, the weight of the filtering base material for removing nitrogen oxide may be varied to adjust the thickness of the first nitrogen oxide absorption layer 106. That is, the thickness of the first nitrogen oxide absorption layer 106 may be thicker in proportion to the weight of the filtering base material for removing nitrogen oxide so that the weight of the filtering base material for removing nitrogen oxide is controlled to advantageously adjust the thickness of the first nitrogen oxide absorption layer 106.

In accordance with Example 3, the thickness of the first nitrogen oxide absorption layer 106 is substantially identical to the thickness of the first ozone absorption layer 104. The specific density of the filtering base material for removing ozone differs from that of the filtering base material for removing nitrogen oxide. Thus, the weight of the filtering base material for removing ozone may be different from that of the filtering base material for removing nitrogen oxide even though the thickness of the first nitrogen oxide absorption layer 106 is substantially identical to that of the first ozone absorption layer 104.

A filtering base material for removing oxide having a first weight is filled on the first nitrogen oxide absorption layer 106 to form a second ozone absorption layer 108. The thickness of the second ozone absorption layer 108 is substantially identical to that of the first ozone absorption layer 104.

A filtering base material for removing nitrogen oxide having a second weight is filled on the second ozone absorption layer 108 to form a second nitrogen oxide absorption layer 110.

A filtering base material for removing ozone having a first weight is filled on the second nitrogen oxide absorption layer 110 to form a third ozone absorption layer 112.

As a result, the chemical filter medium of Example 3 is filled in the tray 100. Here, the chemical filter medium 40 of Example 3 has a preferred thickness of about 20 mm, a preferred length of about 600 mm and a preferred width of about 400 mm.

An upper non-woven fabric 114 is formed on the third ozone absorption layer 112, and an upper mesh 120 composed of stainless steel is installed on the upper non-woven fabric 114 for protecting the upper non-woven fabric 114. The upper mesh 120 includes a plurality of holes formed therethrough. The upper mesh 120 and the lower mesh prevent the activated carbon from leaning due to gravity when the filter is manufactured by filling the filter tray 100.

Although the method of filling the filter medium of Example 3 has been described, the arrangement of the filtering base materials may vary to form other filter media filled in the tray 100 as described in Examples 1 and 2.

When the filtering base materials for removing ozone are filled in the tray 100 by different weights in accordance with the positions of the ozone absorption layers in the tray 100, the thickness of the ozone absorption layers may be different from one another. Though the first ozone absorption layer 22 of Example 1 is formed having two films, the first ozone absorption layer 22 is formed as one film having a weight which is about twice as heavy as that of the two films, which has substantially the same result as in Example 1. That is, when the first ozone absorption layer 22 is formed as one thick film having a thickness which about twice as thick as that of the two films of Example 1, the efficiency of the single thicker film is substantially identical to that of the two films.

Similarly, when the filtering base materials for removing nitrogen oxide are filled in the tray 100 by different weights in accordance with the positions of the nitrogen oxide absorption layers in the tray 100, the thickness of the nitrogen oxide absorption layers may be different one another. Though the nitrogen oxide absorption layer 34 of Example 2 is formed to have the two films, the nitrogen oxide absorption layer 34 is also formed as one film having a weight twice heavier than that of the two films, which has substantially identical efficiency in comparison with Example 2. That is, when the nitrogen oxide absorption layer 34 is formed as one thick film having a thickness twice thicker than that of the two films of Example 2, the efficiency of the one thick film is substantially identical to that of the two films. After the filtering base material for removing ozone and the filtering base material for removing nitrogen oxide are filled in the lower case of the tray 100, the upper case covers the lower case, and then the upper and lower cases are combined together.

In step S16, the tray 100 including the filtering base materials is preferably aged for several days, more preferably for about two days, to thereby complete the chemical filter having a tray type.

A plurality of the tray type chemical filters may be installed in a frame to be employed for a semiconductor fabrication line.

Manufacturing a Hybrid Filter Having Five Layers

EXAMPLE 4

A filter tray having a filter medium that includes five layers is manufactured in accordance with Example 2. In the filter tray having the filter medium, the filter medium includes a first ozone absorption layer having a lower ozone absorption film and an upper ozone absorption film, a nitrogen oxide absorption layer having a lower nitrogen oxide absorption film and an upper nitrogen oxide absorption film, and a second ozone absorption layer formed on the nitrogen oxide absorption layer.

A chemical filter including the filter tray and the filter medium has a thickness of preferably about 20 mm, a length of preferably about 600 mm, and a width of preferably about 400 mm. The weight of a filtering base material for removing ozone is about 1.54 kg, and the weight of a filtering base material for removing nitrogen oxide is also about 1.54 kg. In addition, entire filtering base materials in the filter tray have a weight of about 3.08 kg.

Twelve filter trays are stacked to form a hybrid filter 200 according to the present example.

COMPARATIVE EXAMPLE 1

A hybrid filter 202 is manufactured using the above-described method of Example 4, except for a filter tray of the hybrid filter 202 including filtering base materials for removing ozone only.

COMPARATIVE EXAMPLE 2

A hybrid filter 204 is manufactured using the method of Example 4, except for a filter tray of the hybrid filter 204 including filtering base material for removing nitrogen oxide only.

The following Table 1 shows the constructions of the filter media of Example 4, Comparative Example 1 and Comparative Example 2. Each absorption layer of the filter medium is arranged in according with the direction of air flowing into the filter medium. In the following Table 1, an activated carbon layer corresponds to the ozone absorption layer. The activated carbon layer includes activated carbon and potassium hydroxide impregnated in the activated carbon. A zeolite layer corresponds to the nitrogen oxide absorption layer. The zeolite layer is composed of inorganic material that includes zeolite and potassium permanganate impregnated in the zeolite. In the filter media, the activated carbon and zeolite layers have identical thickness.

TABLE 1

| Construction of Filter Medium | |
|---|---|
| Filter 200 of Example 4 | Activated Carbon (two layers) + Zeolite Layer (two layers) + Activated Carbon Layer (one layer) |
| Filter 202 of Comparative Example 1 | Activated Carbon (five layers) |
| Filter 204 of Comparative Example 2 | Zeolite (five layers) |

Removal Efficiency Test 1

Air having nitrogen oxide (including nitrogen monoxide and nitrogen dioxide) in a concentration of about 10 ppm is filtered using the chemical filters 200, 202 and 204 of Example 4, Comparative Example 1 and Comparative Example 2. The flow rate of the air is about 8 liter/min. The air is at a temperature of about 10 to about 14° C., and a relative humidity of about 85 to about 95%. The concentration of nitrogen oxide is measured at both ends of the chemical filters 200, 202 and 204 at one minute intervals in order to identify the nitrogen oxide removal efficiencies of the chemical filters.

Figure 7:
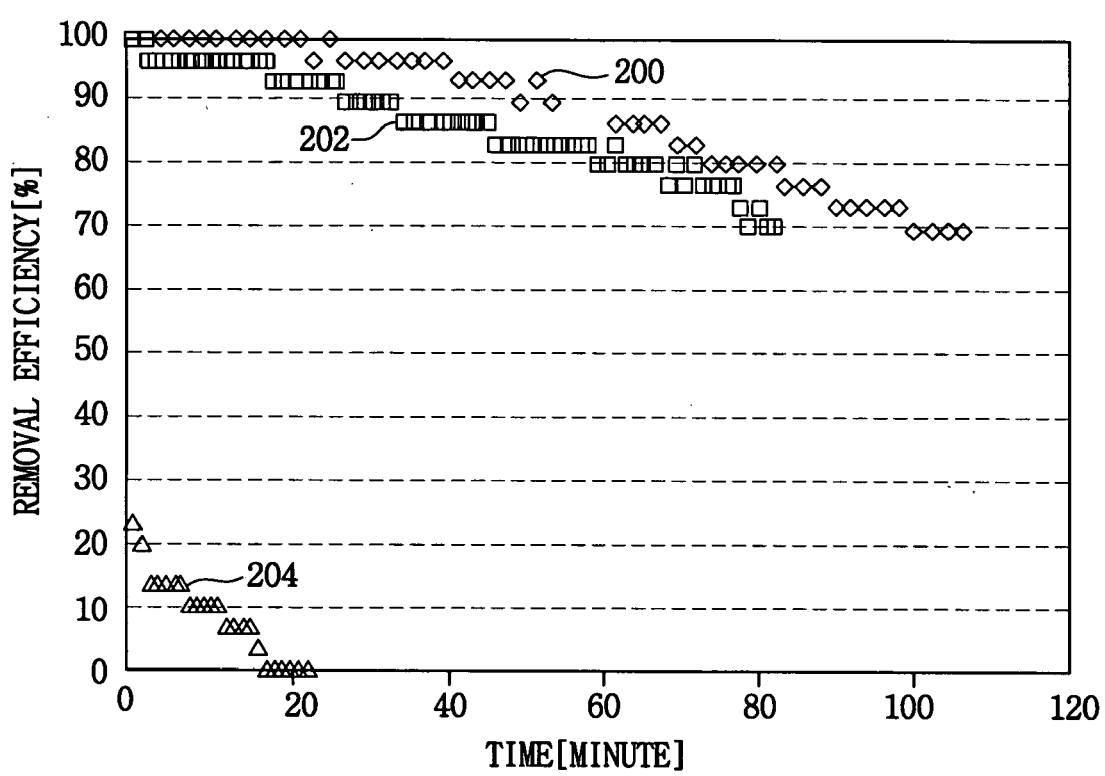
FIG. 7 is a graph showing the removal efficiencies of nitrogen oxide relative to time using filters according to Example 4, Comparative Example 1 and Comparative Example 2.

FIG. 7 is a graph showing the nitrogen oxide removal efficiency relative to time using the filters of Example 4, Comparative Example 1 and Comparative Example 2. In FIG. 7, reference numerals 200, 202 and 204 indicate the filter of Example 4, the filter of Comparative Example 1 and the filter of Comparative Example 2, respectively.

Figure 8:
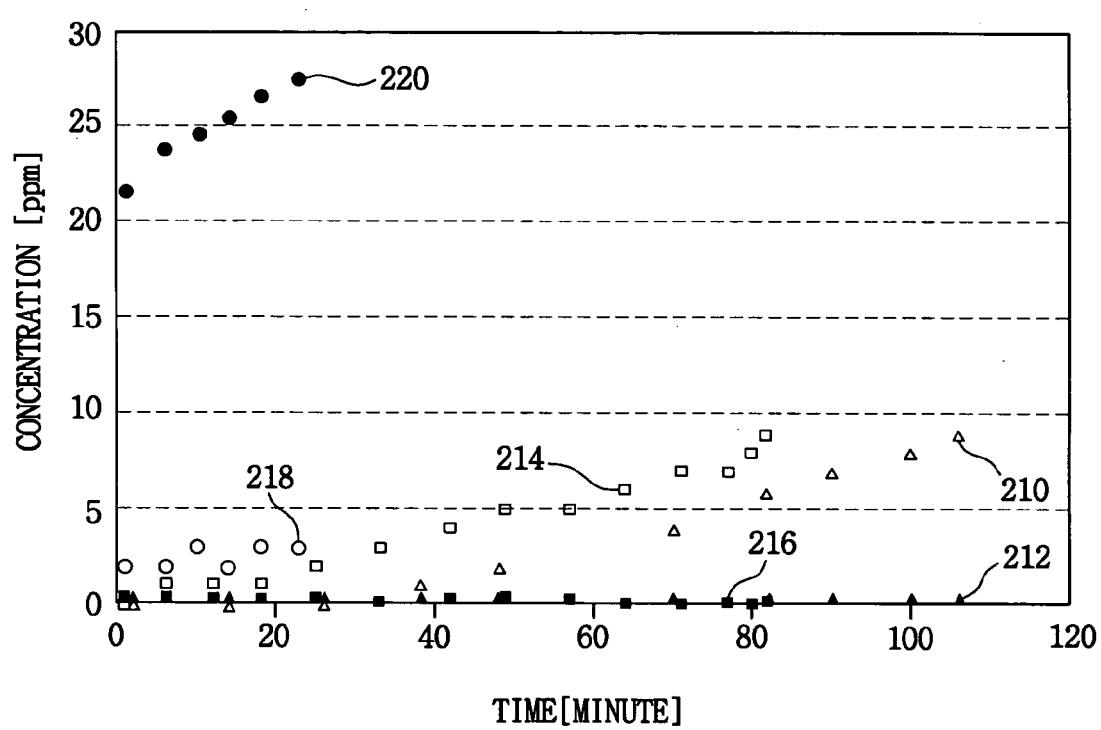
FIG. 8 is a graph showing concentrations of nitrogen monoxide and nitrogen dioxide relative to time after passing through the filter medium of the present invention.

FIG. 8 is a graph showing the concentrations of the nitrogen monoxide and nitrogen dioxide relative to time after passing through the filter media of the chemical filters. In FIG. 8, reference numerals 210 and 212 represent the concentrations of the nitrogen monoxide and nitrogen dioxide after passing the filter 200 of Example 4. Reference numerals 214 and 216 indicate the concentrations of the nitrogen monoxide and nitrogen dioxide after passing the filter 202 of Comparative Example 1. Reference numerals 218 and 220 represent the concentrations of the nitrogen monoxide and nitrogen dioxide after passing the filter 204 of Comparative Example 2.

In accordance with the above-described removal efficiency test, the initial removal efficiencies and the expected lifetimes of the filters 200, 202, 204 of Example 4, Comparative Example 1 and Comparative Example 2 are showed in Table 2. The expected lifetime means a time needed until the removal efficiency of the filter media of the filters becomes below about 70%. The real lifetimes of the filters are assumed to be in proportional to the expected lifetimes of the filters. Using the expected lifetimes of the filters, the lifetimes of the chemical filters may be predicted after the filters are installed in a clean room.

TABLE 2

| Filter | Ex. 4 | Comp. Ex. 1 | Comp. Ex. 2 |
|---|---|---|---|
| Initial removal efficiency (%) | 100 | 96 | 13 |
| Expected lifetime (minute) | 106 | 82 | 0 |

As shown in Table 2 and FIG. 7, the initial removal efficiency percentage and lifetime of the filter 200 of Example 4 are superior to those of filters 202 and 204 of Comparative Example 1 and Comparative Example 2.

Referring to FIG. 8, the concentration 210 of the nitrogen monoxide and the concentration 212 of the nitrogen dioxide using the filter 200 of Example 4 is respectively lower than the concentration 214 of the nitrogen monoxide and the concentration 216 of the nitrogen dioxide using the filter 202 of Comparative Example 1, and the concentration 218 of the nitrogen monoxide and the concentration 220 of the nitrogen dioxide using the filter 204 of Comparative Example 2. In the filter 202 of Comparative Example 1, including only the activated carbon layer, the concentration 214 of the nitrogen monoxide increases as time passes because the nitrogen dioxide is converted to the nitrogen monoxide by the activated carbon layer. As the concentration 214 of the nitrogen monoxide increases, the lifetime of the filter 202 of the Comparative Example 1 is shortened. The filter 202 of Comparative Example 1, which includes the zeolite layer, oxidizes the nitrogen monoxide to form stable nitrates adsorbed in the filter 202 while some of the nitrogen monoxide is exhausted in the form of the nitrogen dioxide. On the other hand, the filter 200 of Example 4 has a filter medium in which the activated carbon layer for adsorbing the ozone, and the zeolite layer for adsorbing the nitrogen oxide, are stacked. Thus, the activated carbon layer and the zeolite layer interact to effectively remove the nitrogen monoxide and the nitrogen dioxide at the same time (refer to reference numerals 210 and 212).

Manufacturing a Hybrid Filter Including Four Layers

EXAMPLE 5

The method of Example 4 is repeated to form a filter 226 of the present example, except that the filter medium of the filter 226 has four layers in accordance with Example 1. A filter tray is manufactured having a filter medium including a first ozone absorption layer including two films of a lower ozone absorption film and an upper ozone absorption film, a single film nitrogen oxide absorption layer, and a second ozone absorption layer formed on the nitrogen oxide absorption layer.

COMPARATIVE EXAMPLE 3

A filter 232 is manufactured using a method identical to that of Example 5, except that the filter medium of the filter 232 is manufactured by mixing activated carbon and a zeolite in a weight ratio of about 50:50.

COMPARATIVE EXAMPLES 4, 5, 6 AND 7

The method in Example 5 is repeated to form filters 222, 224, 226 and 228 having four layers that are arranged as shown in Table 3, and differ in the arrangement of the ozone absorption layers and the nitrogen oxide absorption layers.

The filter media of Example 5 and Comparative Examples 3 to 7 are shown in Table 3. Each of the layers is arranged in accordance with the direction of air flowing into the filters. As for the filter medium of the filters 222 to 230, an activated carbon layer means an ozone absorption layer including activated carbon and potassium hydroxide impregnated in the activated carbon. A zeolite layer is a nitrogen oxide absorption layer including zeolite and inorganic material, for example, potassium permanganate, which is impregnated in the zeolite. Each of the filter media has four layers, and each of the layers has a substantially identical thickness.

TABLE 3

| | Construction of filter medium |
|---|---|
| Filter 232 of Comparative Example 3 | mixed layer of activated carbon:zeolite = 1:1 (four layers) |
| Filter 222 of Comparative Example 4 | activated carbon (one layer) + zeolite (one layer) + activated carbon (one layer) + zeolite (one layer) |
| Filter 224 of Comparative Example 5 | zeolite (one layer) + activated carbon (one layer) + zeolite (one layer) + activated carbon (one layer) |
| Filter 226 of Example 5 | activated carbon (two layers) + zeolite (one layer) + activated carbon (one layer) |
| Filter 228 of Comparative Example 6 | activated carbon (two layers) + zeolite (two layers) |
| Filter 230 of Comparative Example 7 | activated carbon (three layers) + zeolite (one layer) |

Removal Efficiency Test 2

The concentrations of nitrogen oxide at both of front and rear ends of the filters of Example 5 and Comparative Examples 3 to 7 are measured at one minute intervals so as to identify the removal efficiencies in percentage of the nitrogen oxide using the method described in Comparative Example 1.

Figure 9:
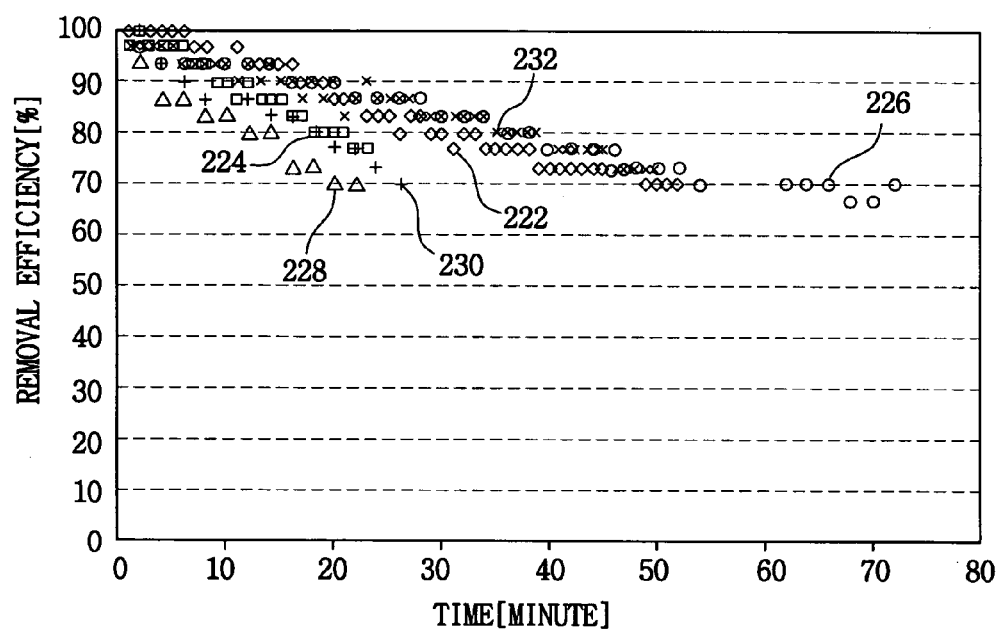
FIG. 9 is a graph showing removal efficiencies of nitrogen oxide relative to time using filters according to Example 5 and Comparative Examples 3 to 7.

FIG. 9 is a graph showing the percentage removal efficiency of the nitrogen oxide relative to time using the filters of Example 5 and Comparative Examples 3 to 7. In FIG. 9, each of reference numerals 226, 232, 222, 224, 228 and 230 corresponds to each of the filters of Example 5 and Comparative Examples 3 to 7, respectively.

The initial removal efficiency and expected lifetimes of the filters are shown in Table 4. The expected lifetime of the filter represents the time needed until removal efficiency percentage of the filter media of the filters becomes below about 70%.

TABLE 4

| Filter | Comp. Ex. 3 | Comp. Ex. 4 | Comp. Ex. 5 | Example 5 | Comp. Ex. 6 | Comp. Ex. 7 |
|---|---|---|---|---|---|---|
| Initial removal efficiency (%) | 93 | 97 | 90 | 93 | 83 | 87 |
| Expected lifetime (minute) | 50 | 52 | 30 | 70 | 22 | 28 |

Referring to Table 4 and FIG. 9, it has been demonstrated that the initial removal efficiency percentage and the lifetime of the filter of Example 5 are superior to those of the filters of Comparative Examples 3 to 7.

The filters of Comparative Examples 6 and 7 having the filter media including the zeolite layers formed on the activated carbon layers have poor initial removal efficiency and lifetime. Further, the filter of Comparative Example 4 having the filter medium including the four layers of the activated carbon, the zeolite, the activated carbon and the zeolite, has high initial removal efficiency percentage but short lifetime. In comparison with the filter of Example 5 having high initial removal efficiency and long lifetime, it is preferable that the activated carbon layer is positioned at the rear portion of the filter where the air enters the filter. Additionally, the filter of Comparative Example 5 which has a filter medium including zeolite, activated carbon, zeolite and the activated carbon, has a high initial removal efficiency and a short lifetime. In comparison, the filter of Example 5 has high initial removal efficiency and a long lifetime. Therefore, it is preferable that the activated carbon layer is positioned at the rear portion of the filter where the air enters the filter.

The filter of Comparative Example 3, including conventional activated carbon and zeolite, has high removal efficiency but a short lifetime.

EXAMPLE 6 AND COMPARATIVE EXAMPLES 8 AND 9

The method of Example 4 is carried out to form filters having four layers as illustrated in Table 5. The filters differ in the arrangement of the ozone absorption layers and the nitrogen oxide absorption layers. Each of the absorption layers is arranged along the direction of the air flowing into the filters. In Table 5, an activated carbon layer comprises an ozone absorption layer including activated carbon and potassium hydroxide impregnated in the activated carbon. A zeolite layer comprises a nitrogen oxide absorption layer including zeolite and potassium permanganate impregnated in the zeolite. The filter of Example 4 is employed as a comparison with the filters of Comparative Examples 8 and 9. Each of the filters 240 to 246 has five layers.

TABLE 5

| | Construction of filter medium |
|---|---|
| Filter 240 of Example 6 | activated carbon layer (one layer) + zeolite layer (two layers) + activated carbon layer (two layers) |
| Filter 242 of Example 4 | activated carbon layer (two layers) + zeolite layer (two layers) + activated carbon layer (one layer) |
| Filter 244 of Comparative Example 8 | activated carbon layer (three layers) + zeolite layer (two layers) |
| Filter 246 of Comparative Example 9 | activated carbon layer (two layers) + zeolite layer (three layers) |

Removal Efficiency Test 3

The concentrations of nitrogen oxide at both of front and rear ends of the filters 242, 240, 244 and 246 of Examples 4 and 6, and Comparative Examples 8 and 9 are measured to identify the removal efficiency of the nitrogen oxide using the method described in Removal Efficiency Test 1.

Figure 10:
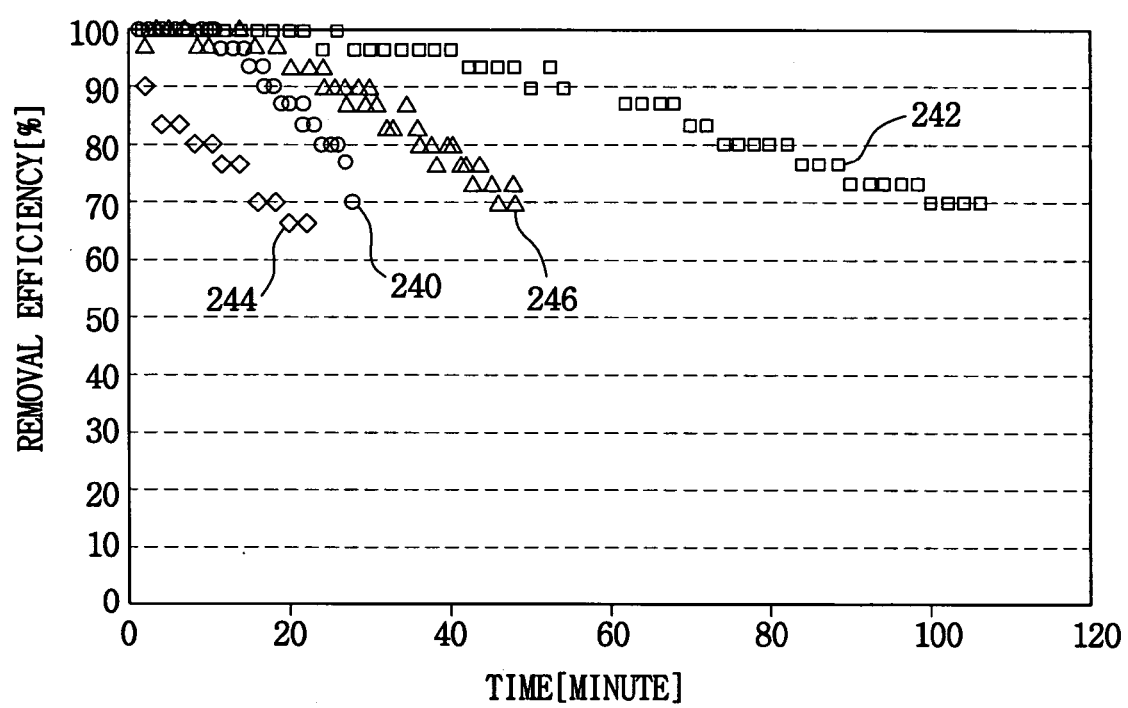
FIG. 10 is a graph showing removal efficiencies of nitrogen oxide relative to time of filter media of the present invention.

FIG. 10 is a graph showing the removal efficiencies and expected lifetimes of filters based on the arrangement of the filter media of the filters. In FIG. 10, reference numerals 242, 240, 244 and 246 indicate the filters of Examples 4 and 6, and Comparative Examples 8 and 9, respectively. Referring to FIG. 10, it can be seen that the arrangement and thickness of each ozone absorption layer and nitrogen oxide absorption layer affects the lifetime and initial removal efficiency of each filter medium. The filters of Examples 4 and 6 have excellent initial removal efficiency compared to the filters of Comparative Examples 8 and 9. In the filters of Example 4 and Example 6, the lifetimes of the filters are longest when the activated carbon double layers are positioned at the rear portions of the filters, and the activated carbon single layer is positioned at the front portion of the filter, with respect to the direction of the air flow into the filters.

Test of Expecting Lifetime of the Hybrid Chemical Filter

The hybrid chemical filter of the present invention was tested under conditions in which increases in the concentration of nitrogen oxide are employed to predict the lifetime of the hybrid chemical filter when it is actually installed in a clean room. Nitrogen oxide having a concentration of about 10 ppm is directed into the filter medium of the filter. Concentrations of the nitrogen oxide at the front and rear ends of the filter medium were measured at 5 to 10 minute intervals until the removal efficiency is not more than about 80%.

These test are used to calculate the lifetime of the filter under conditions in which the filter is installed in an actual clean room. The initial removal efficiency of the filter is measured after purging the filter for about 5 minutes.

The filter employed in this test is the filter of Example 4. This hybrid chemical filter has twelve trays when all of the filter media are installed.

Figure 11:
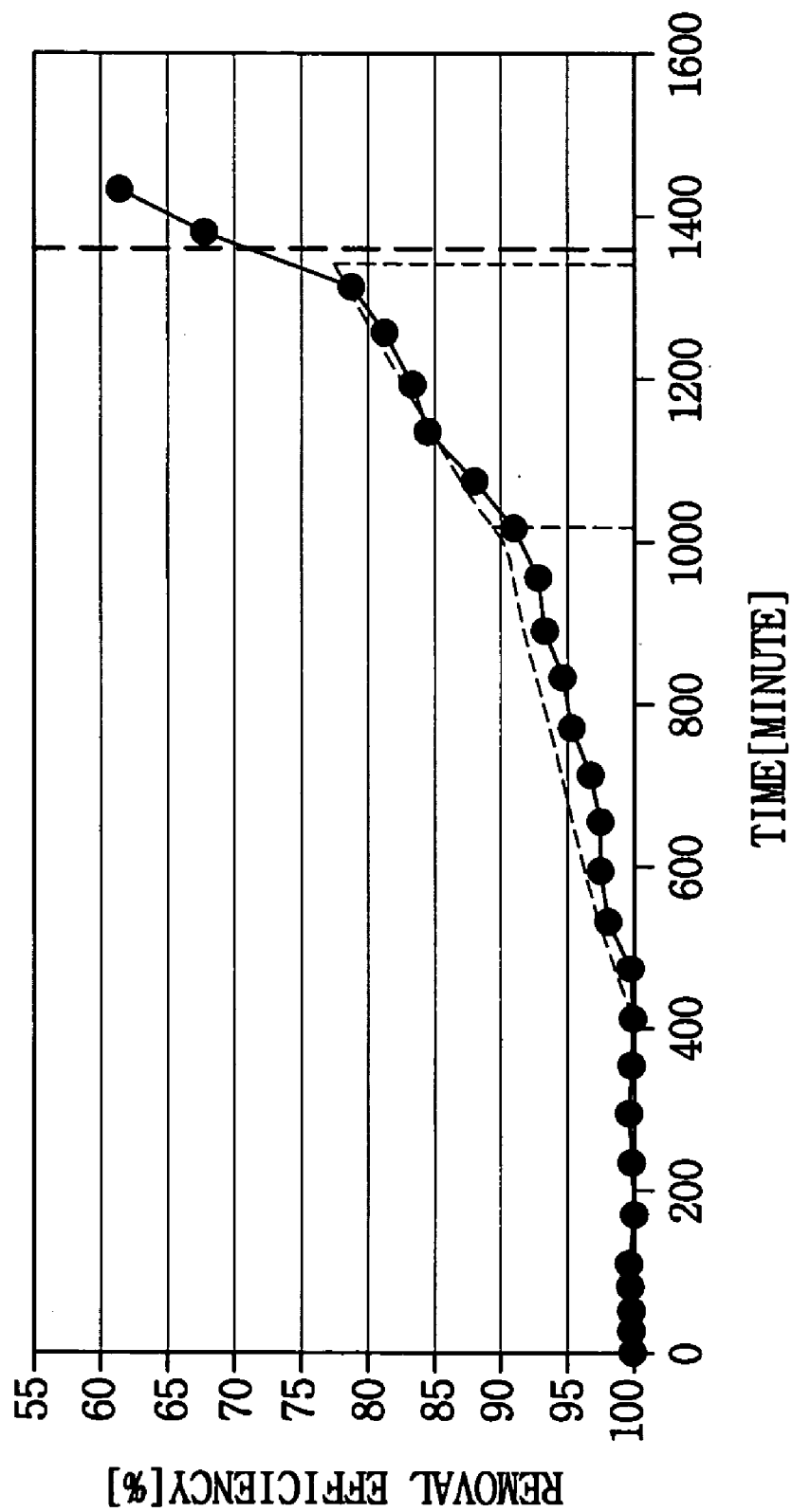
FIG. 11 is a graph showing the removal efficiencies relative to time for the filter of Example 4 which are use for predicting the lifetime of the filter.

FIG. 11 is a graph showing the acceleration test results about the filter of Example 4 for predicting the lifetime of the filter. The calculated removal efficiency and useful life of the filter from FIG. 11 are depicted in Table 6.

TABLE 6

| Removal efficiency | 100% | 90% | 80% | Expected lifetime (based on 80%) | Expected lifetime (based on 70%) |
|---|---|---|---|---|---|
| Lasting time | 490 minute | 1050 minute | 1300 minute | 10.2 months | 12.7 months |

In the acceleration test, the lifetime of the hybrid chemical filter is about 10.2 months when the speed of wind is about 2.0 m/s, average atmosphere concentration is about 30 ppb, and the removal efficiency of the filter is about 80%. When the removal efficiency of the filter is about 70%, the lifetime of the hybrid filter is about 12.7 months.

In addition, the initial efficiencies of the chemical filters of Examples 4 and 5 have been compared to the initial removal efficiency of the conventional hybrid chemical filter having mixed filter media. In each of the chemical filters, contaminants to be removed include ozone, nitrogen monoxide (NO), nitrogen dioxide (NO2), and sulfur oxide (SOx). The initial removal efficiency of each contaminant is measured. The hybrid chemical filter of the present invention has improved initial removal efficiency of nitrogen oxide in comparison with the conventional hybrid chemical filter. The conventional hybrid chemical filter has an initial removal efficiency of nitrogen monoxide of about 50%. However, the hybrid chemical filter of the present invention has initial removal efficiency of ozone, nitrogen oxide and sulfur oxide (SOx) of about 70%.

Figure 12:
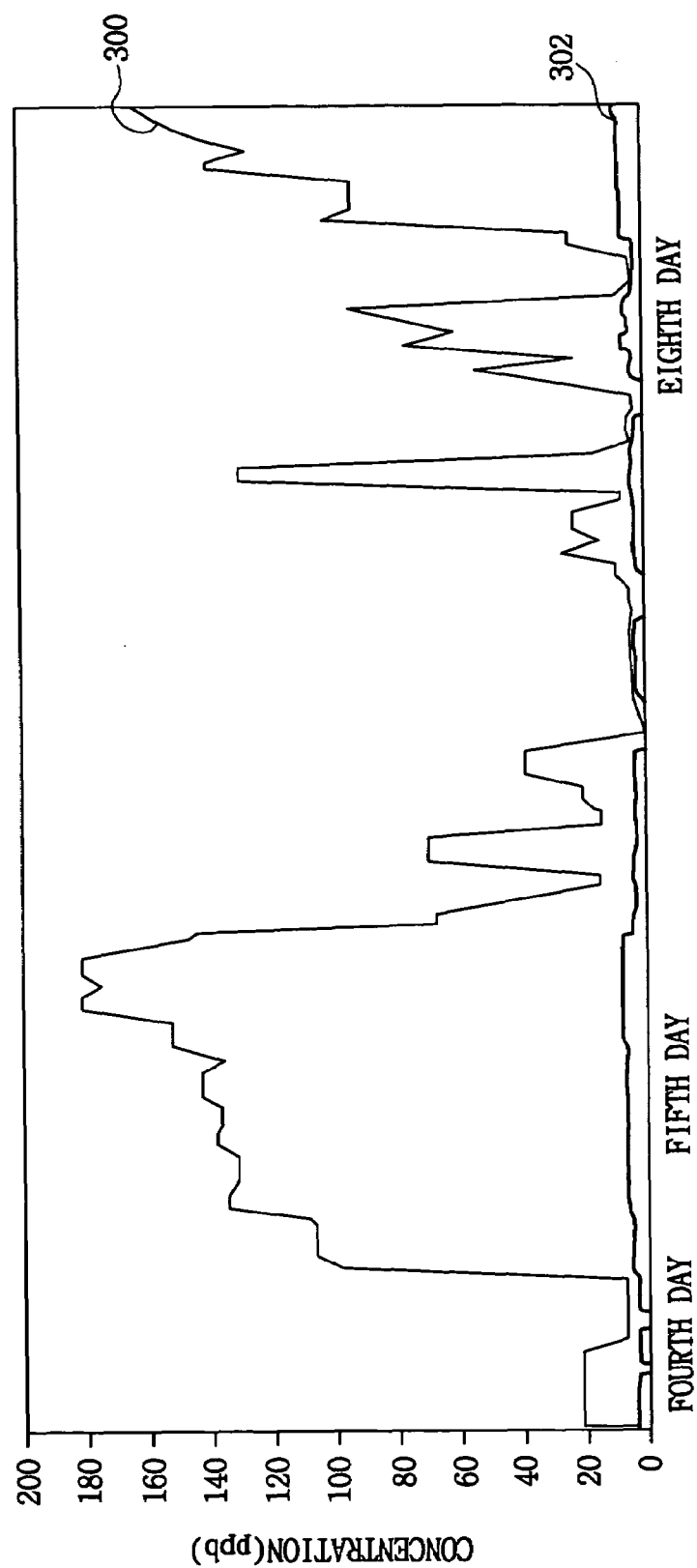
FIG. 12 is a graph showing concentration of nitrogen oxide relative to time using the hybrid chemical filter of Example 5.

FIG. 12 is a graph showing removed amounts of nitrogen oxide relative to time using the hybrid chemical filter of Example 5. In FIG. 12, the reference numerals 300 and 302 indicate the concentrations of nitrogen oxide at the front and rear ends of the hybrid chemical filter. For about 5 days, the average concentration 300 of the nitrogen oxide at the front end of the hybrid chemical filter is about 63.5 ppb. The average concentration 302 of the nitrogen oxide at the rear end of the hybrid chemical filter is about 1.74 ppb. Thus, the average removal efficiency of the nitrogen oxide of the chemical filter is about 96.7%.

As described above, the hybrid chemical filter medium of the present invention effectively simultaneously removes contaminants like ozone, nitrogen oxide or sulfur oxide. When the filter medium of the present invention is employed in a clean room, a plurality of filters are not required in order to remove various contaminants, and the cost for manufacturing and maintaining the filters is reduced. The hybrid chemical filter effectively removes contaminants in the clean room to improve the throughput of the semiconductor devices.

Exemplary examples of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A chemical filter medium comprising:
   a first ozone absorption layer that is substantially planer for removing ozone, the first ozone absorption layer including a first filtering base material for removing ozone;
   a first nitrogen oxide absorption layer that is substantially planer for removing nitrogen oxide formed on the first ozone absorption layer, the first nitrogen oxide absorption layer including a filtering base material for removing nitrogen oxide; and
   a second ozone absorption layer that is substantially planer for removing ozone formed on the first nitrogen oxide absorption layer, the second ozone absorption layer including a second filtering base material for removing ozone,
   wherein each of the first ozone absorption layer, first nitrogen oxide absorption layer, and the second ozone absorption layer are directly disposed on each other.

2. The chemical filter medium of claim 1, wherein each of the first and second filtering base materials for removing ozone includes activated carbon and an impregnating agent in the activated carbon.

3. The chemical filter medium of claim 2, wherein the impregnating agent includes a metal oxide.

4. The chemical filter medium of claim 2, wherein the impregnating agent includes one of potassium hydroxide and manganese monoxide.

5. The chemical filter medium of claim 2, wherein the impregnating agent is present in an amount of from about 5 to about 10 weight percent, based on a weight of the activated carbon.

6. The chemical filter medium of claim 1, wherein the filtering base material for removing nitrogen oxide includes zeolite and an impregnating agent in the zeolite.

7. The chemical filter medium of claim 6, wherein the impregnating agent includes a metal oxide.

8. The chemical filter medium of claim 6, wherein the impregnating agent includes potassium permanganate.

9. The chemical filter medium of claim 8, wherein the potassium permanganate is present in an amount of from about 10 to about 15 weight percent based on a weight of the zeolite.

10. The chemical filter medium of claim 1, wherein the first ozone absorption layer is positioned at a front portion of the filter medium with respect to the direction of air flow, and the first ozone absorption layer has a thickness greater than that of the first nitrogen oxide absorption layer.

11. The chemical filter medium of claim 1, wherein the first ozone absorption layer has a thickness substantially the same as that of the first nitrogen oxide absorption layer.

12. The chemical filter medium of claim 1, wherein the second ozone absorption layer has a thickness substantially the same as the thickness of the first nitrogen oxide absorption layer.

13. The chemical filter medium of claim 1, wherein the first ozone absorption layer is positioned at a front portion of the filter medium with respect to the direction of air flow, and the second ozone absorption layer has a thickness which is less than that of the first nitrogen oxide absorption layer.

14. The chemical filter medium of claim 1, further comprising a second nitrogen oxide absorption layer and a third ozone absorption layer sequentially formed on the second ozone absorption layer.

15. The chemical filter medium of claim 14, wherein each of the first, second and third ozone absorption layers have a thickness substantially the same as the thickness of each of the first and second nitrogen oxide absorption layers.

16. A chemical filter medium comprising:
   a first layer for removing ozone, the first layer including a filtering base neutral material and a catalyst for reducing ozone impregnated in the filtering base neutral material;
   a second layer for removing nitrogen oxide formed on the first layer, the second layer including a filtering base oxide material and a catalyst for decomposing and removing nitrogen oxide impregnated in the filtering base oxide material; and
   a third layer for removing ozone formed on the second layer, the third layer including a filtering base neutral material and a catalyst for reducing ozone impregnated in the filtering base neutral material.

17. The chemical filter medium of claim 16, wherein the first layer has a thickness substantially the same as that of the second layer.

18. The chemical filter medium of claim 16, wherein the second layer has a thickness substantially the same as that of the third layer.

19. The chemical filter medium of claim 16, wherein each of the filtering base neutral materials of the first and third layers includes activated carbon.

20. The chemical filter medium of claim 16, wherein each catalyst for reducing ozone of the first and third layers includes either one of potassium hydroxide and manganese monoxide.

21. The chemical filter medium of claim 16, wherein the filtering base oxide material of the second layer includes zeolite.

22. The chemical filter medium of claim 16, wherein the catalyst for decomposing and removing nitrogen oxide of the second layer includes potassium permanganate.

23. The chemical filter medium of claim 16, wherein the filtering base oxide material includes an impregnating agent including a metal oxide.

24. The chemical filter medium of claim 16, further comprising:
a fourth layer for removing the nitrogen oxide formed on the third layer, the fourth layer including a filtering base oxide material and a catalyst for decomposing and removing the nitrogen oxide impregnated in the filtering base oxide material; and
a fifth layer for removing ozone formed on the fourth layer, the fifth layer including a filtering base neutral material and a catalyst for reducing ozone impregnated in the filtering base neutral material.

25. A chemical filter comprising:
a tray having an upper case, and a lower case connected to the upper case;
a first ozone absorption layer that is substantially planer for removing ozone located at a lower portion of the lower case, wherein the first ozone absorption layer includes a filtering base material for removing ozone;
a first nitrogen oxide absorption layer that is substantially planer for removing nitrogen oxide located on the first ozone absorption layer in the lower case, wherein the first nitrogen oxide absorption layer includes a filtering base material for removing nitrogen oxide; and
a second ozone absorption layer that is substantially planer for removing ozone located on the first nitrogen oxide absorption layer in the lower case, wherein the second ozone absorption layer includes a filtering base material for removing ozone, and wherein each of the first ozone absorption layer, first nitrogen oxide absorption layer, and the second ozone absorption layer are directly disposed on each other.

26. The chemical filter of claim 25, wherein each of the filtering base materials for removing ozone includes activated carbon and an impregnating agent in the activated carbon.

27. The chemical filter of claim 26, wherein the impregnating agent includes one of potassium hydroxide and manganese monoxide.

28. The chemical filter of claim 25, wherein the filtering base material for removing nitrogen oxide includes zeolite and an impregnating agent in the zeolite.

29. The chemical filter of claim 28, wherein the impregnating agent includes potassium permanganate.

30. The chemical filter of claim 25, further comprising:
a second nitrogen oxide absorption layer formed on the second ozone absorption layer in the lower case; and
a third ozone absorption layer formed on the second nitrogen oxide absorption layer in the lower case.

31. The chemical filter of claim 25, further comprising a non-woven fabric formed inside of the tray.

32. The chemical filter of claim 31, further comprising a mesh attached to the non-woven fabric to protect the non-woven fabric.

33. A method of manufacturing a chemical filter comprising:
providing a tray including an upper case and a lower case, respectively;
introducing a first ozone absorption layer that is substantially planer into the lower case of the tray, wherein the first ozone absorption layer includes a filtering base material for removing ozone;
forming a first nitrogen oxide absorption layer that is substantially planer on the first ozone absorption layer in the lower case, wherein the first nitrogen oxide absorption layer includes a filtering base material for removing nitrogen oxide;
forming a second ozone absorption layer that is substantially planer on the first nitrogen oxide absorption layer in the lower case, wherein the second ozone absorption layer includes a filtering base material for removing ozone; and
connecting the upper case to the lower case, wherein the upper case covers the lower case, and wherein each of the first ozone absorption layer, first nitrogen oxide absorption layer, and the second ozone absorption layer are directly disposed on each other.

34. The method of claim 33, further comprising attaching a non-woven fabric inside of the tray before introducing the first ozone absorption layer.

35. The method of claim 33, wherein each of the filtering base materials for removing ozone includes activated carbon and an impregnating agent in the activated carbon.

36. The method of claim 35, wherein the impregnating agent is introduced into the activated carbon by an immersing process.

37. The method of claim 33, wherein the filtering base material for removing nitrogen oxide includes zeolite and an impregnating agent in the zeolite.

38. The method of claim 37, wherein the impregnating agent is introduced into the activated carbon by an immersing process.

39. The method of claim 33, further comprising sequentially forming a second nitrogen oxide absorption layer and a third ozone absorption layer on the second ozone absorption layer.

40. A chemical filter medium comprising:
a first ozone absorption layer for removing ozone, the first ozone absorption layer including a first filtering base material for removing ozone;
a first nitrogen oxide absorption layer for removing nitrogen oxide formed on the first ozone absorption layer, the first nitrogen oxide absorption layer including a filtering base material for removing nitrogen oxide; and
a second ozone absorption layer for removing ozone formed on the first nitrogen oxide absorption layer, the second ozone absorption layer including a second filtering base material for removing ozone, wherein each of the first and second filtering base materials for removing ozone includes activated carbon and an impregnating agent in the activated carbon, and wherein the impregnating agent includes one of potassium hydroxide and manganese monoxide.

41. A chemical filter medium comprising:

a first ozone absorption layer for removing ozone, the first ozone absorption layer including a first filtering base material for removing ozone;

a first nitrogen oxide absorption layer for removing nitrogen oxide formed on the first ozone absorption layer, the first nitrogen oxide absorption layer including a filtering base material for removing nitrogen oxide; and a second ozone absorption layer for removing ozone formed on the first nitrogen oxide absorption layer, the second ozone absorption layer including a second filtering base material for removing ozone, wherein the filtering base material for removing nitrogen oxide includes zeolite and an impregnating agent in the zeolite.

42. A method of manufacturing a chemical filter comprising:

providing a tray including an upper case and a lower case, respectively;

attaching a non-woven fabric inside of the tray;

after attaching a non-woven fabric inside of the tray, introducing a first ozone absorption layer into the lower case of the tray, wherein the first ozone absorption layer includes a filtering base material for removing ozone;

forming a first nitrogen oxide absorption layer on the first ozone absorption layer in the lower case, wherein the first nitrogen oxide absorption layer includes a filtering base material for removing nitrogen oxide;

forming a second ozone absorption layer on the first nitrogen oxide absorption layer in the lower case, wherein the second ozone absorption layer includes a filtering base material for removing ozone; and connecting the upper case to the lower case, wherein the upper case covers the lower case.

* * * * *